(12) United States Patent
Bong

(10) Patent No.: US 8,946,582 B1
(45) Date of Patent: Feb. 3, 2015

(54) SYSTEM AND METHOD FOR METAL POWDER WELDING

(76) Inventor: William L. Bong, Walnut Creek, CA (US)

( * ) Notice: Subject to any disclaimer, the term of this patent is extended or adjusted under 35 U.S.C. 154(b) by 854 days.

(21) Appl. No.: 12/572,945

(22) Filed: Oct. 2, 2009

(51) Int. Cl.
*B23K 9/04* (2006.01)

(52) U.S. Cl.
USPC .................................. 219/73.21; 219/73.1

(58) Field of Classification Search
CPC ........... B23K 9/186; B23K 9/324; B23K 9/04
USPC ............. 219/125.1, 125.11, 73.1, 73.11, 136, 219/137.31, 137.7, 139, 73.2, 73.21
See application file for complete search history.

(56) References Cited

U.S. PATENT DOCUMENTS

| | | | | |
|---|---|---|---|---|
| 4,957,628 A | * | 9/1990 | Schulz | 210/519 |
| 5,945,014 A | * | 8/1999 | Crockett et al. | 219/137 PS |
| 6,188,037 B1 | * | 2/2001 | Hamada et al. | 219/61 |
| 7,047,695 B2 | * | 5/2006 | Allen et al. | 52/120 |
| 2001/0045420 A1 | * | 11/2001 | Bong et al. | 219/125.1 |
| 2002/0005397 A1 | * | 1/2002 | Bong et al. | 219/125.1 |
| 2002/0079301 A1 | * | 6/2002 | Bong et al. | 219/130.5 |
| 2008/0011727 A1 | * | 1/2008 | Peters | 219/130.5 |

\* cited by examiner

*Primary Examiner* — Henry Yuen
*Assistant Examiner* — Ayub Maye
(74) *Attorney, Agent, or Firm* — Charles L. Thoeming

(57) ABSTRACT

A system and method for submerged arc metal powder welds includes modular programmable control of: a) a weld torch, and the position of the welding wire(s) from the torch traveling within a weld cavity, b) the rate of metal powder and welding flux added to the weld cavity ahead of the weld torch, c) the matching ratio between of metal powder and welding wire within the weld cavity, and d) a square wave welding torch power supply. An embodiment includes a controlled column and boom manipulator with up to six axes of motion and controlled motorized slide assemblies for single or multi-pass welds. A method of use is also disclosed.

9 Claims, 10 Drawing Sheets

SYSTEM AND METHOD FOR METAL POWDER WELDING

CROSS-REFERENCES TO RELATED APPLICATIONS

None.

STATEMENT REGARDING FEDERALLY SPONSORED RESEARCH OR DEVELOPMENT

None.

REFERENCE TO A MICRO-FICHE APPENDIX

None.

TECHNICAL FIELD

This invention relates to welding. More particularly, the invention is related to a system and method for submerged arc metal powder welding applications including, but not limited to, the Arcmatic™ HD SubArc+MP™ welding system and method.

BACKGROUND OF THE INVENTION

For some time now there has been a need for a better method to reduce the cost for making longitudinal welds on beams and columns and for making circumferential and longitudinal welds on heavy wall vessels. A faster method could improve the economics for making long welds on heavy plate. These longitudinal and circumferential welds are generally one of four types: (1) horizontal fillet weld, (2) fully positioned fillet welds, (3) full penetration groove welds, or (4) partial penetration groove welds. These welds have traditionally been produced with either multi-pass submerged arc, or multi-pass flux-cored wire, on plate thicknesses ranging from ⅜" thick to 4.00" thick and up.

The drawbacks to the conventional multi-pass submerged welding is the: (1) Increased number of passes required to fill up the weld: (2) Increased consumption of welding flux to complete the weld, (3) Increased time required to remove the flux slag after each pass and, (4) Increased time it takes to complete the weld to maintain weld soundness and mechanical properties commensurate with the properties required by the AWS D1.1 Structural Code, and the AWS D1.8 Seismic Code, or the AWS D1.5 Bridge welding codes.

In the conventional submerged arc welding (SAW) process, less than 20% of the arc energy is utilized in melting the electrode wire. The remainder is: (1) dissipated in melting the base plate and welding flux, (2) used in superheating the weld pool, (3) lost in overheating the plate, and (4) lost in the atmosphere. During the melting of welding flux and base plate, the arc energy expended in superheating the weld pool and creating excessive fusion in the base plate is harmful and undesirable. The excessive melting of the base plate results in deeper penetration, larger heat affected zone (undesirable), and higher dilution; therefore, a system and method for better utilization of the arc energy is needed.

When welding with higher amperages, to increase the rate of deposition, higher heat input on groove welds and fillet welds are required, using the single wire, dual-wire (two wires in one single torch), or tandem wire DC/AC (two torches in tandem). Increased heat input causes the welding flux to lock into the wet lines (where the weld metal meets the parent material) using the multi-pass welding technique. Removing the welding flux from each weld pass requires careful and time consuming slag removal and clean up after each pass. If the residual flux is not completely removed from each pass, the flux can be included into the resultant weld, causing a defects that may be extremely expensive to repair, To solve the problem created by high heat input welds, locking flux into the wet lines, the operator generally uses smaller multi-pass welds to eliminate the problem. This solution results in lower amperages, lower deposition rates, and thus more expensive welds.

In an effort to improve the welding economics for longitudinal heavy plate welds, while still maintaining quality, Arcmatic™ has developed a high amperage, high deposition, single or multi-pass variation of submerged arc welding called "High Deposition Submerged Arc plus Metal Powder" (HD-SubArc+MP™). This Arcmatic™ process uses $\frac{1}{16}$-inch, $\frac{5}{64}$-inch, $\frac{3}{32}$-inch, $\frac{1}{8}$-inch, or $\frac{5}{32}$-inch (or the metric equivalent) diameter welding wires, in a single torch (dual-wire), or two dual-wire torches in tandem (one torch behind the other). The process uses very high current density, in conjunction with a metal powder additive in the weld joint.

The very high current is provided with two constant voltage DC welding power supplies connected in parallel, or two square wave AC power supplies connected in parallel.

This welding system and method is capable of producing a full penetration groove weld, or a single pass fillet welds on plate thickness (up to 1.50 inch thick) in one single pass, from one side. Based on production experience, the HD-SubArc+MP™ welding system and welding method offers tremendous advantages over a traditional single-wire, dual-wire or tandem-wire submerged arc weld.

The HD-SubArc+MP™ welding system is not a pre-approved process and must be accompanied by developing a Welding Procedure Specification (WPS) and a Procedure Qualification Record (PQR,) as outlined in the AWS D1.1 Structural Steel Welding Code, the AWS D1.8 Seismic Welding Code, and/or the AWS D1.5 Bridge Welding Code—whichever applies.

An object of the HD-SubArc+MP™ welding system and method is to increase the depth of each weld pass when making a Multipass weld, or increasing the thickness of plate that can be welded in a single pass; thus increasing the deposition rate, minimizing the clean-up after each pass, reducing the consumption of flux, with the goal in mind of making a more economical weld.

These properties will, in many cases, allow one-sided submerged arc welding of thick steel plates by using a specially formulated welding flux that will meets all the conditions listed above.

Another advantage of the HD-SubArc+MP™ welding system and method is that it is able to overcome the problems associated with other high amperage submerged arc welding process, such as: (1) inability to remove the flux from the wet lines, (2) creating rejects as a result of flux inclusions in the resultant weld bead, or (3) generating cracks in the weld created by the high heat inputs.

A further objective of the Arcmatic HD-SubArc+MP™ welding system is to provide a system and method that creates better control of the weld bead shape, minimize base metal dilution, reduce the total heat input into the parent material, and the reduce or eliminate any magnetic field that can deflect the welding arc, resulting in a weld defect.

Additional objectives of the HD-SubArc+MP™ welding system and method is to provide a method that is capable of efficiently making a single-pass weld, or a multi-pass weld for both longitudinal and circumferential welds on thick, heavy plate steel on beams, columns, vessels, and like structures.

The HD-SubArc+MP™ welding process incorporated Narrow Gap and/or Narrow Groove welding. Narrow Gap welding process incorporates two plates welded together. The two plates are welded using two square cut plates, spaced between ⅜-inch to 518-inch apart and the gap between the two square cut plates is filled with metal powder prior to using the HD-SubArc+MP™ welding process. The Narrow Groove welding process involves beveling each of the two plates with a smaller bevel than is generally used in a multi-pass welding process. Standard weld joints generally use between 30-to-45-degree included angle with a ¼-to-⅜-inch root opening. The Narrow Groove welding process used with HD-SubArc+MP™ generally incorporates a ⅜-inch root opening with a 15-degree included angle or less. This allows the two plates to be joined together using much less filler metal lower heat inputs, and uses much less time to make the weld.

Using the Arcmatic™ HD-SubArc metal powder welding systems, a variety of welding joints can be welded, including horizontal fillet welds, fully positioned fillet welds, multipass groove welds, single pass groove welds, double bevel groove welds, single bevel groove welds, full penetration groove welds, and full penetration groove welds. This large variety of welding grooves may be necessary in the fabrication of structural steel box columns, bridge girders, buildup columns, heavy-wall pressure vessels, wind towers and like structures, offshore platforms, shipbuilding panel line fabrication, etc. These structures are readily fabricated using the HD-Sub-Arc+MP™ process.

DISCLOSURE OF INVENTION

To achieve improved utilization of arc energy, a new variation of SAW has been created. High Density Dual-Wire+ Metal Powder, or two Dual-Wire torches in tandem+Metal Powder are used to create the welding process (HD-SubArc+MP™).

The method of welding involves adding a Ferro-alloy metal powder ahead of the arc, using either a Constant Voltage DC welding power supply(s), or a Square Wave AC Constant Voltage power supply(s). Using a Square Wave AC welding power supply substantially decreases the magnetic effect created by a DC welding power supply. Decreasing the magnetic effect allows the metal powder to flow more freely without magnetizing the metal powder particles together, thus hampering the free flow of the powder from the dispenser to the weld groove. Although adding metal powder to the submerged arc welding process has been in existence for over fifty years, minimal effort has been made to study the effect of heat input in relationship to metal powder feed rate and the resulting metal powder percentage of total deposited metal. In an attempt to analyze this, tests have been made, using the "Bead on Plate" ("BOP") method, with conventional consumables on a ¼ inch thick low carbon mild steel plate to determine the amount of heat recovery. The submerged arc unit used for the experimental work included two 1000-Amp, power supplies connected in parallel, using Rectified Direct Current, Reverse Polarity (DCRP) welding power supplies, plus a wire feeder and computerized, programmable control. Owing to the simplicity of the setup, metal powder was added ahead of the travel direction of the weld torch. A metal powder feeder was attached to the standard welding unit, so that the amount of powder dispensed could be read from the digital meter on the operator's control panel.

The deposition rate included the deposition rate of the welding wire and the deposition rate of the metal powder. The deposition rate was read from a closed-loop controlled wire feeder with quadrature encoder feedback to a digital meter on the operator's control panel. The metal powder was computer controlled as a percentage of wire feed speed deposition rate, so an exact ratio could be determined. The average arc-time was determined by recording the amperage and voltage output from a programmable computer (within +/-1% accuracy); along with the length of the weld and travel speed of the weld. The metal powder addition was measured, using arc-on time and weighing the plate before and after welding. The power recovery was computed by subtracting the total weight of the wire deposited from the total weight of the weld. The percentage of actual powder addition (MP %) was calculated based on 8 lb/hr as the wire deposition rate before welding.

It was discovered that using the Arcmatic™ HD-SubArc™ process, the total heat input to the parent material was decreased, and weld quality and productivity was increased. This result was achieved for two principal reasons.

First, the higher dual-wire welding current completely melts the meal powder to the full depth of the weld joint. Since the metal powder makes up 50% of the resultant weld metal, it also absorbs 50% of the heat input required to make the weld [Amps×Volts×60/Travel Speed (−) 50%]. The parent material absorbs only 50% of the heat input—cutting the total heat input to the parent material in half—resulting in a smaller Heat Affected Zone ("HAZ") and less distortion.

Second, the dual welding wires plus the metal powder form a single molten puddle, composed of 50% weld wire and 50% metal powder. This puddle can remain molten from 4 to 6 inches behind the welding arc, depending on the total wattage input and the weld travel speed. The heat from the molten puddle causes the walls of the weld joint to melt. When the molten metal solidifies, it forms the resultant weld nugget. The total energy absorbed to melt the metal powder absorbs 50% of the total heat input used to generate the welding arc. This reduces by 50% the amount of heat available to be absorbed by the parent material as HAZ—resulting in a much smaller and finer grain HAZ than a comparable SAW weld made without adding metal powder.

HD-SubArc+MP™ welds, produced with a Square Wave AC welding power supply, also tends to produce less heat to the weld puddle than the conventional DC welding power supplies, and employs superior control of the welding arc to produce better physical weld properties for ESW and ESW-NG welds. A variety of Square Wave AC power supply designs are capable of producing acceptable HD-SubArc+MP™ welds, including, but not limited to, SCR power supplies, IGBT power supplies, constant voltage power supplies, and DC power supplies connected "Electrode Positive" (DCEP)—also referred to as DC Reverse Polarity; and connected "Electrode Negative" (DCEN)—also referred to as DC Straight Polarity, and Constant Voltage DC power supplies used in tandem with either square wave AC/DC power supplies for the trail arc or constant current AC power supplies used for the trail arc. Extensive research has been done by others comparing submerged arc welding, using Constant Voltage DC welding power supplies as opposed with Square Wave AC welding power supplies has been compiled and reported.

Subsequent studies of welds made with Constant Voltage DC power supplies compare the heat generated by DCEP with DCEN. These studies show that welding with DCEP always ran much hotter than welding DCEN. It was further discovered that welding with the DC power supply always created a strong magnetic field that tended to pull the penetration of the weld puddle to one side or the other, depending on the direction of the magnetic field.

HD-SubArc+MP™ welds, using a square wave AC welding power supply helps reduce the magnetic field problem. Using the square wave AC power supplies resulted in having associated metal powder formulations no longer subjected to the strong magnetic pull that tends to deflect the metal powder from the center of the weld cavity—causing substandard or defective welds or causing the weld to stop altogether. When the metal powder is deflected within the weld cavity, the weld penetration can be pulled in the direction of the bend. The Square Wave AC welding power supply reduced, or eliminated the magnetic field, and the weld tended to stay in the center, with balanced penetration on all sides of the weld cavity when using the new HD-SubArc+MP™ welding process.

It further has been observed that the DCEP half cycle of the AC Square Wave produces higher heat input into the parent material, and the DCEN produces lower heat input into the parent material. Thus, the ability to adjust the wave form to set the amount of "on time" for the DCEP portion of the AC wave form, as opposed to the amount of "on time" for the DCEN portion of the AC wave form, allows the operator to adjust the heat input to the parent material. The capability of controlling the shape of the Square Wave by independently setting the height and width of the DCEP portion as opposed to the DCEN portion, when welding with the HD-SubArc+MP™ welding process, allows the welding operator to more closely controls the shape and the penetration of the weld bead into the weld groove. Accordingly, the amount of base metal dilution of the resultant weld puddle is significantly reduced.

Using the HD-SubArc+MP™ process with a Square Wave AC welding power supply better controls the weld bead shape, minimizes the base metal dilution, reduces the total heat input into the parent material, and the reduces or eliminates the magnetic field. The development of the HD-SubArc+MP™ uses, for the first time, a Square Wave AC welding power to produce SAW welds, incorporating metal powder addition.

The higher current required by the process increases deposition rates more than 100% over conventional submerged arc processes. Deposition rates of 100-to-150 lbs/hr are typically realized in production welding.

The HD-SubArc+MP™ welding process can be performed by using either solid submerged arc welding wires traditionally used for standard submerged arc welding. The process can also use metal core welding wires. When developing multi-pass welding procedures for the process, the welding wire alloy should be matched with the metal powder alloy to produce consistent weld chemistry from pass-to-pass. Using metal core wires makes it far easier to match the chemistry of the welding wire with the chemistry of the metal powder. When making a single pass procedure with the joint filled with metal powder doesn't require that the welding wire and the metal powder chemistry are perfectly matched. The WPS and PQR that must be performed to qualify the welding process will always be the same chemistry for single pass welding procedures filled with metal powder. An embodiment of HD-SubArc+MP™ welding process uses dual welding wires, each of which has a ⅛ inch diameter. Another embodiment of HD-SubArc+MP™ welding process uses dual welding wires, each of which has a 5/32 inch diameter.

When the HD-SubArc+MP™ welding process is computer controlled within ½ of 1%, and the metal powder is allowed to flow freely to the weld joint, the ratio of metal powder-to-welding wire can be controlled very precisely from weld pass to weld pass to maintain a constant chemistry from pass-to-pass.

Other increases in productivity may result because welding is generally done in one or two passes, reducing slag removal time between passes. In some cases the powder added in small quantities helps to maintain uniform penetration and fusion in joints with varying fit up. Production welds have been made to structural steel beams and columns, ranging in thicknesses from ⅜-inch to 4-inches. Weld lengths typically range from 1-foot to over 60-feet.

The metal powder formulations are a proprietary Arcmatic™ formulation, used in conjunction with a custom formulated Arcmatic™ proprietary high current, fused, agglomerated, or bonded welding fluxes. The custom formulated welding fluxes are an important feature of the welding process. Standard SAW welding fluxes are generally too high in silicon. This silicon turns to glass at the high amperages when used with the high heat input multi-pass HD-SubArc+MP™ process. This glass locks into the wet-lines of the weld and is almost impossible, and/or totally un-economical to remove. For this reason, Arcmatic™ developed a custom, high current welding flux that is extremely stable at high currents and that can be easily remove from deep grooves multi-pass HD-SubArc welds when used on heavy plate multi-pass and single pass welding applications.

This combination of metal powder and welding flux meets all of the requirements of the AWS-D1.1, AWS D1.8, and AWS D1.5 codes—but it is not a pre-qualified welding procedure, and must be qualified in accordance with the applicable welding code. After developing a Welding Procedure Specification ("WPS") and a Procedure Qualification Record ("PQR"), the process can be used for most heavy plate applications on longitudinal and circumferential groove and fillet welds.

Metal powder welding methods are most successful when applied with the dual-wire/single-torch submerged arc welding process. Dual (⅛-inch, or 5/32-inch) diameter welding wires are capable of carrying currents up to 2000-amps for single pass welding. These high amperages allow the process to achieve the deep penetration necessary for single pass welding. Dual 1/16 inch, 5/64 inch or 3/32 inch wires are normally used for multi-pass welds with or without powder. Although powder has been used with the single-wire, dual-wire, and tandem-wire submerged arc welding processes, the most successful and economical has been with the dual-wire/single arc process.

The HD-SubArc+MP™ process uses both solid welding wires and metal core welding wires to perform SAW welds, using metal powder addition. Adding a small amount of iron powder ahead of the welding arc helps control penetration on poorly fitted joints. Metal core welding wires have the advantage of being able to make small batches of specially formulated wires more economically. Making a special formulation of a solid wire is much more difficult and expensive.

The submerged arc process with powder can best be visualized by referring to FIGS. 1-22. A dual-arc welding setup is illustrated in which the metal powder completely fills the welding joint ahead of the dual-wire welding arc and welding flux supply. The welding program variables are established for maximum penetration through the powder into the backup bar. The backup bar can be made from steel, ceramic, or copper; with a groove in the backup bar to allow full penetration of the weld nugget. The welding flux supply covers the molten weld puddle, as in a conventional submerged arc weld. A relatively high current is applied, using either a DCRP (electrode positive), or a Square Wave AC welding arc, to the dual welding wires. The molten welding flux following the arc solidifies into a slag that protects the molten weld metal from oxidation and other potential contamination.

Submerged arc welding flux plays a significant role in the successful performance of a producing a single-pass, or multi-pas HD SubArc+MP welding procedure. The art of welding flux design to produce a perfect weld incorporates more particularly the art of formulating welding fluxes for the HD-SubArc+MP welding process that improve the detachability of slag at high amperages and makes each single-pass or multi-pass weld free from slag inclusion and free from side-wall undercut at the wet lines (where the weld metal meets the side wall of the weld joint) of each weld pass. The metal powder deposition rate is programmable and computer controlled, as is the welding wire feed speed, weld travel speed, and welding power supply output for both DC and Square Save AC power supplies. The metal powder is deposited ahead of the molten weld puddle and is metered into the weld joint as a percentage of welding wire feed speed, so that the exact percentage of wire-to-metal powder is recorded and can be repeated weld-after-weld. The metal powder can also be added to the entire weld joint manually, and the depth controlled with a dept spacer device to control the consistency of metal powder percentage to the resultant weld nugget.

As mentioned above Welding Procedure Specifications (WPS) must be developed and documented with the proper Welding Qualification Records (WQR) The welding procedure will establish welding parameters such as Volts, Wire Feed (Amps), Powder Percent, Travel Speed etc. The programmable Computer Control will allow the operator to electronically file these parameters for future use, and if so desire prevent the accidentally or purposely changing the parameters.

This feature allows the fabricator to establish a WPS to develop a PQR, as set forth in the AWS D1.1 Structural Code, the AWS D1.8 Seismic Code, and the AWS D1.5 Bridge Code; and all other applicable codes, for any HD-SubArc+MP welding procedure and insures that the same percentage welding wire and metal powder are repeated for every weld.

In the manufacturing of beams, columns, heavy-wall pressure vessels, wind towers, and the like, where many of the welds are thick plate steels welds, a large portion of the man hour cost is consumed by joining the two pieces of thick plate together using the multi-pass submerged arc welding process. All welding processes should have the goal of producing these heavy plate welds with the best possible quality, free from defects and inclusions. Accordingly, welding materials used for such purposes should ensure good welding workability and should not produce welding defects which require later correction. A factor that influences welding workability is the above mentioned detachability of the welding flux from the weld metal and the parent material. When submerged arc welding is conducted using a welding flux that has poor slag detachability, much labor and time can be consumed in removing slag that is locked into the wet lines of the previous weld pass. If the slag is not completely removed prior to succeeding weld passes, welding defects, such as poor penetration, slag inclusion, and undercutting the sidewall can occur and can negatively affect the quality of the weld when a subsequent layer is applied. To avoid this possibility, great care has gone into the development of a proper welding flux to improve the stability of the welding arc at higher amperages, to improve the slag detachability for multi-pass welds, and to eliminate slag inclusion inside the weld metal.

A great deal of effort has been put forth by several flux manufacturing companies around the world to incorporate a welding flux with the characteristics listed above. Previous welding flux formulations that have been proposed to solve the problems associated with poor slag detachability incorporate an assortment of chemical compounds such as $Al_2O_3$, $TiO_2$, $SiO_2$, in suitable amounts. When high amperage heat input welding is conducted using welding fluxes which contain more than 20% $Al_2O_3$, however, a slag inclusion phenomenon occurs in which slag is included in the molten metal and locked into the wet line of the previous weld pass. The solidified slag inclusion in the weld becomes impossible or uneconomical to remove.

In order to reduce the amount of $Al_2O_3$ in welding fluxes and improve the detachability of the slag, studies have been made by various flux manufacturing companies, running an extremely large number of welds to evaluate a large range in variety of welding flux formulations. Close attention was paid to specific formulations that influence detachability. Though a number of the factors that influence detachability have been known, including solidifying temperature, viscosity, wetability, thermal expansion coefficient, and the like, the focus of the study was to solve the problem for welds made with metal powder addition, performed at very high amperages (from 1000 to 2000 Amps). To achieve this favorable end, it has been found that a welding flux should have a relatively high solidifying temperature and a high viscosity at high temperatures. This extensive study of welds using welding fluxes which satisfy the above requirements developed various kinds and proportions of welding flux constituents and compounds.

The first objective of studies was to find a welding flux formulation that would provide excellent arc stability at amperages in excess of 1000-Amps. In addition, the welding flux would have to insure excellent weld bead shape and resistance to cracking of the weld metal. Each weld pass had to provide the perfect platform for succeeding weld passes to avoid welding flux inclusion and incomplete penetration into the wet lines of the previous weld pass.

A major objective for the HD-SubArc+MP™ welding process was to evaluate these studies to select the type of flux to produce perfect welds, using the HD-SubArc+MP™ process. Welds that could provide excellent detachability of slag, without causing any slag inclusion. This detachability of slag would allow any fabricator to do multiple pass metal powder welds on metal thickness that could not be welded with any other single pass welding process.

Another objective of the study to develop the perfect flux for HD-SubArc+MP™ was to evaluate the reduction in the amount of $Al_2O_3$ compared with prior welding flux/arc counterparts to improve the quality of each weld pass.

Finally, welding flux development has been important to accommodate welding with the HD-SubArc+MP™ welding process to enable various welding thick steel plate materials, simply and rapidly.

In order to further improve low temperature toughness, the Charpy Impact Value, the welding flux composition had to be formulated with specific ingredients in specific proportions to accommodate optimum weld bead formation when using high heat inputs for heavy plate welding with metal powder. This optimum weld bead profile had to provide easy detachment of slag while suppressing slag inclusion. In addition, the welding flux composition had to satisfy all the requirements for superior bead shape appearance, excellent notch toughness, and resistance to cracking of the weld metal.

For high efficiency welding applications, it is preferable to perform weld joints in single-pass welding with a high amperage and high heat input, to produce lower cost welds to the weld fabricator. If plate thickness exceeds the limits of a single-pass welding procedure, it is necessary to make a multi-pass weld. For multi-pass welds, the welding flux must have excellent detachability at high amperage, high heat input welding procedures.

The quantity of weld deposition is increased by using this welding flux in conjunction with a joint that has metal powder added ahead of the welding arc. Using either multiple electrodes in a single welding torch or using multiple welding torches with multiple electrodes, this system and method for HD-SubArc+MP™ welding process with much higher heat inputs produces single-pass welds in ever thicker, steel weld plates, even plate thicknesses exceeding one-inch. However, the thickness which can be welded by one pass has certain limitations even if the above method is employed. Furthermore, as the welding heat input increases the characteristics of the welded joint are adversely affected, limiting the thickness of plate that can be welded in a single-pass. In these cases, it becomes necessary to use a multi-pass welding procedure. Multi-pass welding procedures require a welding flux with excellent detachability.

When multi-pass submerged arc welding is conducted with a large heat input, the amount of slag increases in proportion to the increase of the heat input, and more significantly the slag becomes more difficult to remove. As a result, the removal of slag takes a long time. Failure to remove all the slag, however, will surely cause welding defects. This factor is what principally determines whether a weld must be made in multi-passes, instead of one single-pass welding procedure.

In order to overcome the above-described problems, the HD-SubArc+MP™ welding system and method has been developed so that the slag can be readily be removed from a high amperage, high heat input weld that has been performed by adding iron powder ahead of the welding arc and adjusting the composition of the welding flux to perform a perfect weld every time.

The welding flux developed for high amperage, high heat input, multi-pass welding of thick steel plates can be conducted efficiently with the above described method because the thickness of the slag does not increase to unacceptable heights in a multi-pass weld groove. Also, because far fewer weld passes are needed with the HD-SubArc+MP welding method, compared to conventional Multipass SAW welding, far less flux is use to complete a heavy plate weld.

The system and method for metal powder welding can be used for many known welding techniques including, but not limited to, fillet welds, partial penetration welds, full penetration welds, double sided grove welds (with land in the middle), single-pass welds, multi-pass welds, single-wire welds, dual-wire welds, single dual-wire torch welds, and tandem dual wire torch welds.

The system and method for metal powder welding applications include, but are not limited to, the following components: motorized box slide assembly(ies) for seam tracking to maintain the welding wire in its proper relationship to the weld joint; wire feeder assembly for feeding dual wires; HD SubArc+MP™ dual wire welding torch assembly; mechanical air-cooled seam tracking probe assembly; laser seam tracking probe assembly; motorized metal powder dispenser; motorized dual-Wire Straightener, welding flux recirculation assembly; drum turner and brake assembly; articulated U-groove welding wire guide; welding system motion devices; and electrical control modules for HD SubArc+MP™ welding.

The method for metal powder deposition includes a programmable computer control component, used for: (1) controlling the motorized box slide assemblies used for seam tracking, and controlling the motorized box slide for weld torch oscillation, (2) manually jogging the horizontal and vertical axis of the box slides, (3) receiving command signals from the horizontal and vertical axis of a contact seam tracking probe to control the box slides, (4) receiving signals from the laser probe that measures the volume of the metal required to fill the weld groove and controlling welding wire speed and metal powder deposition rate to fill the weld groove, (5) receiving signals from the horizontal and vertical signals from a laser probe seam probe to control the box slides. The programmable computer control component is also used for: (6) controlling the horizontal axis for a welding head oscillator, (7) controlling the vertical axis for an automatic vertical control ("AVC") slide to control torch height control, (8) controlling the three-axis weld cube for seam tacking and oscillation. There are three versions of the motorized box-slide. These three versions are contained within a (1) six inch cube, (2) ten inch cube, and (3) fourteen inch cube component, depending on the degree of use intended for the box slide.

The wire feeder assembly for HD-SubArc+MP can also be used for other welding applications. The wire feeder is programmable, computer control component, that can be used for all single wire welding processes; dual-wire welding processes, for Sub-Arc welding ("SAW"), Electroslag welding ("ESW"), and narrow gap Electroslag welding "(ESW-NG"), and for four-wire welding processes for ESW, and ESW-NG; SAW wire feeders in tandem with one, two or four welding wires; and use for HD SubArc+MP™ welding with two or four wires.

The HD SubArc+MP™ torch assembly of the system and method for metal powder welding applications further includes, but is not limited to, a single dual-wire torch assembly and a tandem dual wire torch assembly.

Each of the mechanical air-cooled seam tracking probe assembly, the laser seam—tracking probe assembly, the motorized metal powder dispenser, and the motorized dual wire straightener of the system and method for metal powder welding applications further include programmable computer controlled components.

The welding flux recirculation component of the system and method for metal powder welding applications further includes, but is not limited to, at least one vacuum pump and hose assembly, at least one pressure chamber and hose assembly, at least one filter to separate fine particles, and at least one secondary hopper and drop valve.

Motion device superstructures for the system and method for metal powder welding applications include, but are not limited to, a boom manipulator assembly, a single head gantry assembly, a dual head gantry assembly, a side-beam carriage assembly, a portable tractor assembly, and a movable beam, stationary welding station assembly. Any and all motion devices that either move the welding torch assembly, or cause the weld joint to move under the weld torch assembly, such as a rotating cylinder or a moving beam or column; where the welding torch assembly remains in a fix location while the weld joint moves The electrical control modules necessary for programmable control for HD SubArc+MP™ welding of the system and method for metal powder welding applications include, but are not limited to, at least one power supply module to provide power for DC motors and computer controls, at least on operator's control panel module, at least one three-axis computer controlled, programmable manipulator module, at least one six-axis computer controlled, programmable, closed-loop motor control modules for 1) X-axis, 2) Y-axis, 3) oscillator, 4) wire feeder, and 5) metal powder dispenser, (6) motorized wire straightener, and at least one welding power supply module, a plurality of motor power connection cables, and a plurality of closed-loop signal control cables.

BRIEF DESCRIPTION OF DRAWINGS

These and other features, aspects, and advantages of the system and method for metal powder welding applications will become better understood with regard to the following description, appended claims, and accompanying drawings as further described.

BEST MODE FOR CARRYING OUT THE INVENTION

Referring more specifically to the drawings, for illustrative purposes the system and method for submerged arc metal powder welding applications is embodied generally in FIGS. 1-22. It will be appreciated that the system may vary as to configuration and as to the details of the parts, and that the method of using the system may vary as to details and to the order of steps, without departing from the basic concepts as disclosed herein. The system and method is disclosed generally in terms of HD-SubArc+MP™ welding, and depicted for multiple examples of welding operations as this system and method can be widely used, FIGS. 1-7B. The disclosed apparatus for system and method for metal powder welding applications can be practiced, however, by those having ordinary skill in the art according to the embodiments disclosed herein.

The motorized light-duty seam-tracker cross-slide assembly and options for the system and method for submerged arc metal powder welding is depicted in FIGS. 8-13, and 19. An embodiment of the system and method for metal powder welding includes seam-tracking slides that are 6½ inches square and that are designed to fit into small spaces can, and that are designed to carry a 25 pound load. Another embodiment of the system and method for metal powder welding includes seam-tracking slides 10 inch square seam-tracking slides that are designed to carry a 100 pound load. Each slide box is made from aluminum casting for maximum rigidity and minimum slide deflection. All of the mechanical complements are contained inside the slide box to protect them from dust, dirt, and welding flux contamination.

Figure 12:
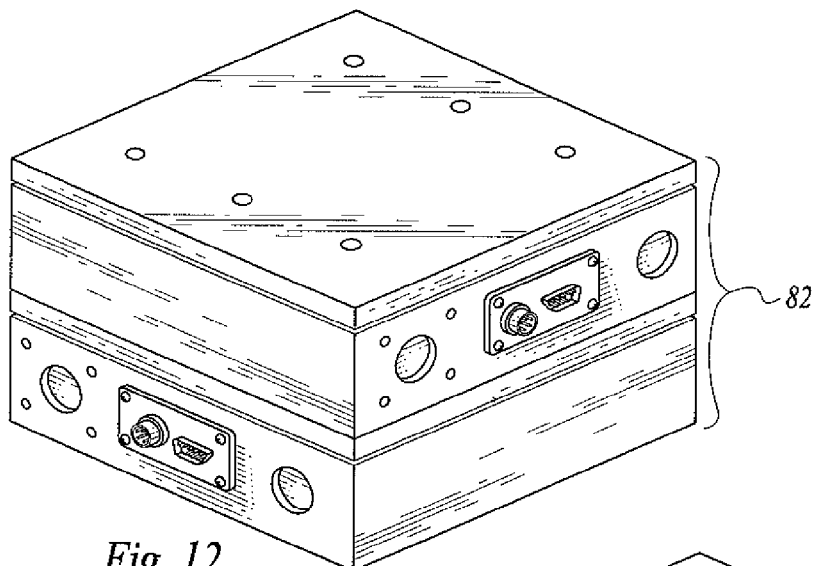
FIG. 12 is perspective view of a double seam tracker/cross slide assembly 82 of an embodiment of the system and method for metal powder welding applications for directional control of a welding torch along the "X" and "Y" axes within a longitudinal weld cavity.

For example without limitation, an embodiment of the system and method for submerged arc metal powder welding includes two slides 82 designed to carry a dual-wire single arc welding torch and a seam tracking probe assembly, FIG. 12, and provide directional control of a welding torch along the "X" and "Y" axes within a longitudinal or circumferential weld cavity, allowing the welding wires of the welding torch to be adjustably positioned within the weld cavity. The back slide is the horizontal seam tracking axis and the front slide is the vertical seam tracking axis.

Figure 11:
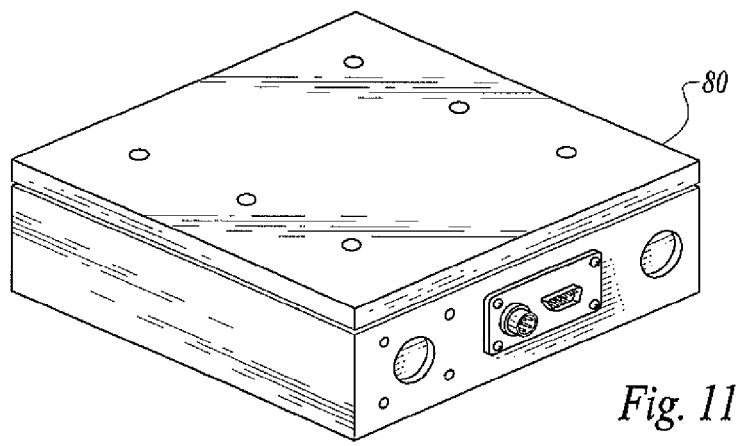
FIG. 11 is perspective view of a single seam tracker/cross slide assembly 80 of an embodiment of the system and method for metal powder welding applications for directional control of a welding torch along the "X" axis within a longitudinal weld cavity.

Similarly, another embodiment of the system and method for submerged arc metal powder welding includes one slide 80 designed to carry a dual-wire single arc welding torch and a seam tracking probe assembly, FIG. 11, and provide directional control of a welding torch along the "X" within a longitudinal or circumferential weld cavity, allowing the welding wires of the welding torch to be adjustably positioned within the weld cavity.

Figure 13:
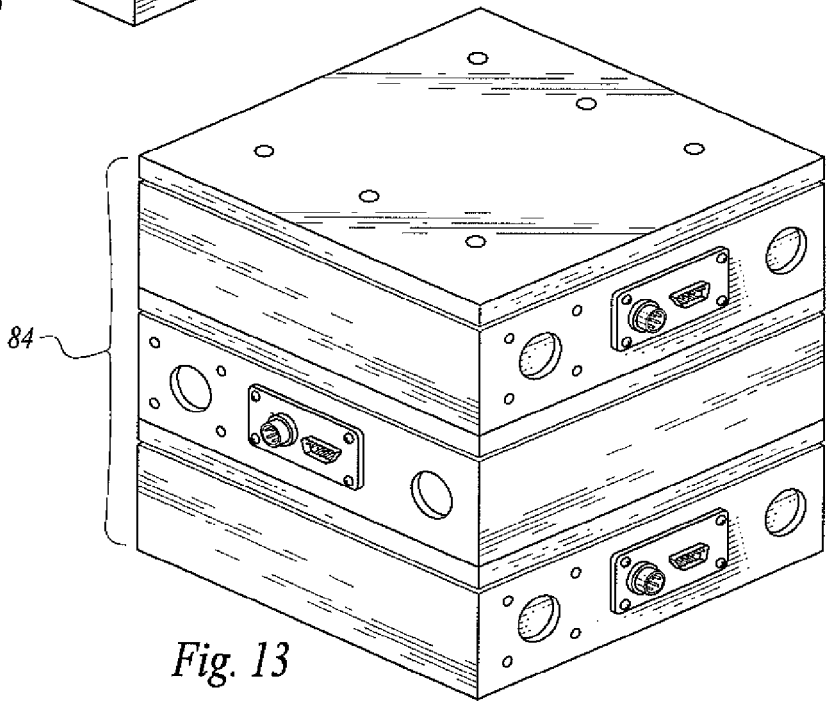
FIG. 13 is perspective view of a triple seam tracker/cross slide assembly 84 of an embodiment of the system and method for metal powder welding applications for directional control of a welding torch along the "X" and "Y" axes, and oscillation of the welding torch within a longitudinal weld cavity.
Figure 14:
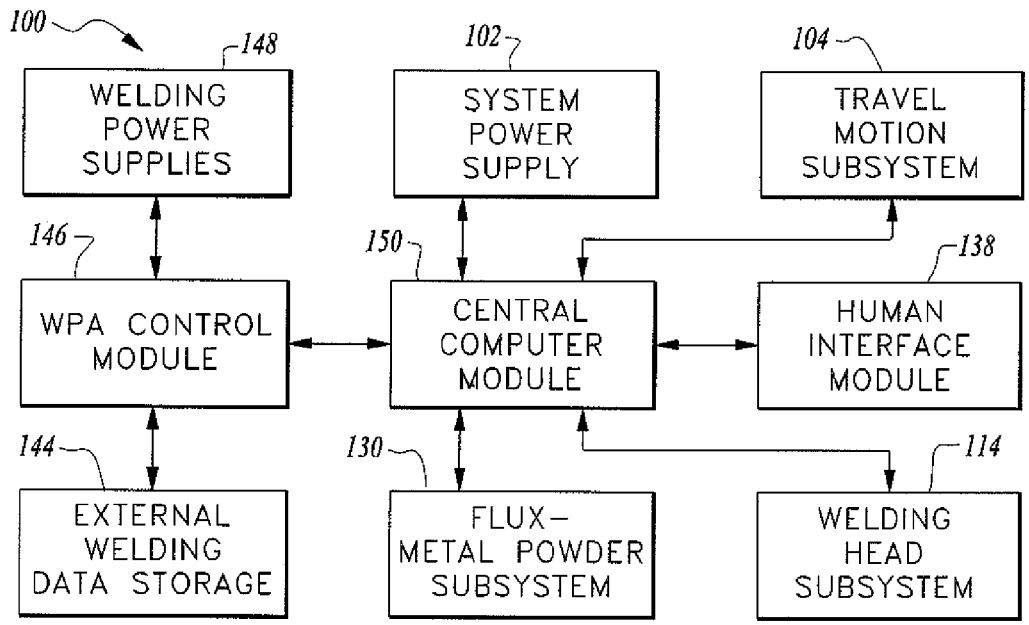
FIG. 14 is a representative control schematic for the modular welding control system 100 for an embodiment of the system and method for metal powder welding applications.
Figure 15:
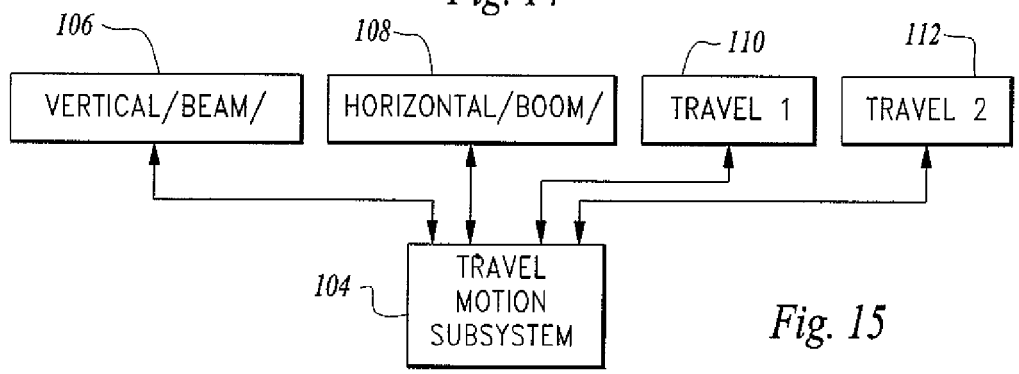
FIG. 15 is a representative control schematic for the travel motion subsystem 104 of the modular welding control system 100 of FIG. 13 for an embodiment of the system and method for metal powder welding applications.

Yet another embodiment of the system and method for submerged arc metal powder welding includes three slides 84 designed to carry a dual-wire single arc welding torch and a seam tracking probe assembly, FIG. 13. These three slides provide directional control of a welding torch along the "X" and "Y" axes, and oscillate the welding torch within a longitudinal or circumferential weld cavity, allowing the welding wires of the welding torch to be adjustably positioned within the weld cavity. A more detailed description of embodiments of the light-duty seam-tracker cross slide assembly is discussed further in this disclosure.

The controllable motorized cross slide box assemblies 80, 82 or 84, FIGS. 11-13 respectively, are mounted on the front of the boom swivel head assembly 98 of a weld motion device, FIGS. 8-10 and 19 depending on the type of welding application desired for the embodiment of the system and method for metal powder welding. The welding torch 40 and seam-tracking probe 52 are mounted on the front face of 6½ inch cross slides for an embodiment of the system and method for metal powder welding, FIGS. 8-10 and 19. For another embodiment of the system and method for metal powder welding, the welding torch 40, welding flux hopper 64, and seam tracking probe 52 are mounted on the front face of the 10 inch cross slides. As the motion device carries the welding torch longitudinally or circumferentially down the weld seam, the air-cooled contact seam-tracking probe 52 senses horizontal and vertical deviations of the weld seam and sends correcting information back to the singular or combined seam-tracking cross-slides 80, 82 or 84, as may be used, to move them up-and-down or right-and-left to hold the welding torch 40 in its preselected proximity to the weld seam. As many as six axes of controlled motion can be provided by combined controllable motorized cross slide box assemblies.

FIG. 13 depicts the square motorized oscillator slide mounted on the front face of dual vertical seam-tracking cross-slides 84. The oscillator is designed to oscillate the welding torch 40 as it travels down the seam. Oscillation allows the HD-SubArc+MP™ system and method for metal powder welding to perform a multi-pass weld on heavy plate, FIG. 5B. When using this process, successive passes can be filled with metal powder to increase the deposition rate and reduce the heat input to the parent material. Oscillating the welding torch 40 back and forth between the wet-lines of the preceding weld pass maintains good fusion between the molten weld metal and the sidewalls of the weld joint.

For the embodiment of motorized oscillator slide assembly of the system and method for metal powder welding depicted in FIG. 13, a square oscillator is used for applications that require a reliable oscillating mechanism that is not susceptible to malfunction due to dust, dirt, and welding flux jamming the internal operation of the motorized slide. The slide has been designed as a square box with all of the moving components located inside the box for less susceptibility to damage from the outside. Dimensions for embodiments of the square oscillator mechanism include 6.5 inches square, 10 inches square, or 14 inches square, depending upon the work load and size required of the oscillator slide assembly.

The slide is made up of two hardened and ground weighs located inside the box. Linear bearings are mounted inside the two slide blocks. In turn, the linear bearings are driven back-and-forth on the hardened weighs to perform the oscillation motion. A 24 V DC motor with quadrature encoder attached to the back of the motor shaft drives a belt, connected to a ball screw. As the motor turns back and forth, the ball screw turns back and forth inside a ball that that is connected to the slide blocks, resulting in an oscillating motion of the slide blocks. A dust cover, with two slots, allows the two slide blocks to move back and forth in the slots. A mounting plate is then attached to the slide blocks for mounting the mechanism to be oscillated.

Figure 1:
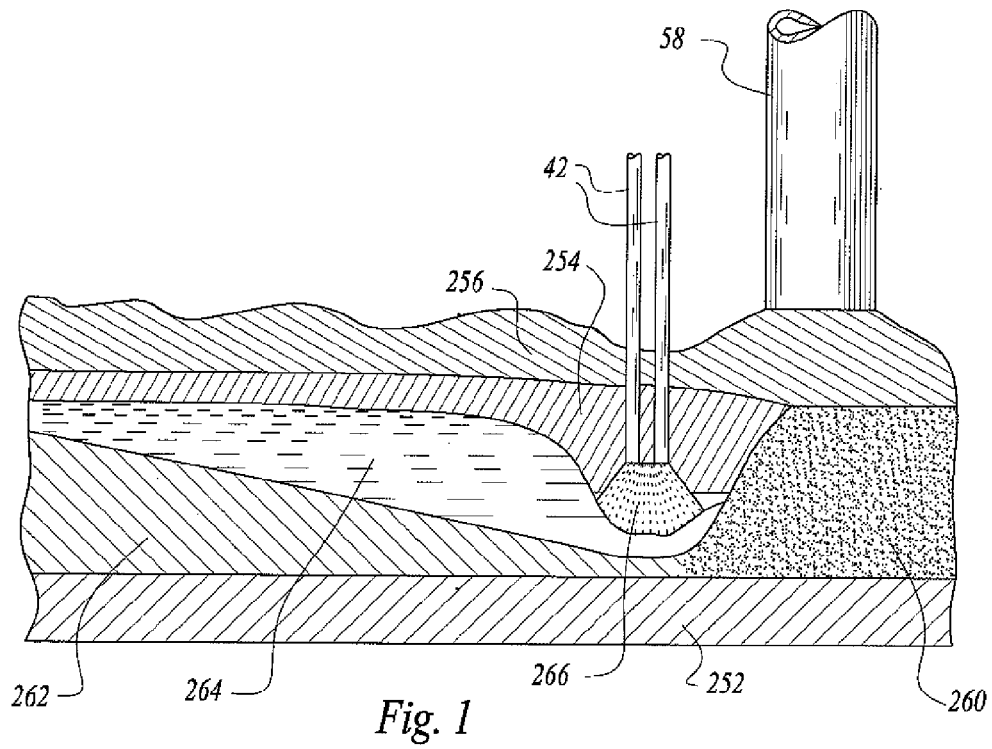
FIG. 1 is a side view of a HD-SubArc+MP™ metal powder weld according to an embodiment of the system and method for metal powder welding applications, depicting a single dual wire welding torch assembly 42 traveling within a longitudinal weld cavity of defined length under un-melted welding flux 256, molten welding flux 254, metal powder 260, with corresponding solidified weld metal 262, molten weld metal 264, welding arc 266, and back-up bar 252.
Figure 2A:
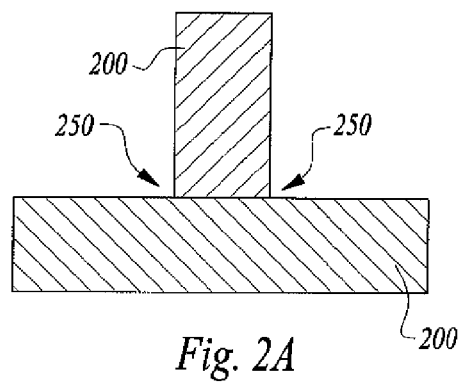
FIG. 2A is an end view of adjustable workpieces 200 and corresponding longitudinal weld cavities 250 of defined length positioned for a HD-SubArc+MP™ metal powder fillet weld.
Figure 2B:
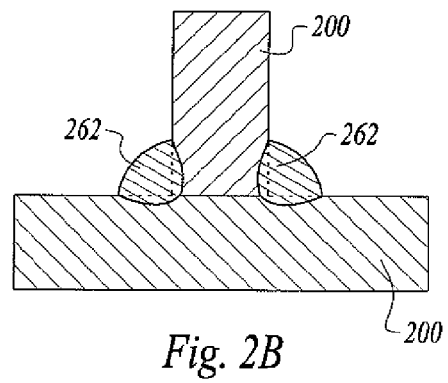
FIG. 2B is an end view of FIG. 2A after the HD-SubArc+MP™ metal powder weld 262 has been made within each longitudinal fillet weld cavity 250.
Figure 3A:
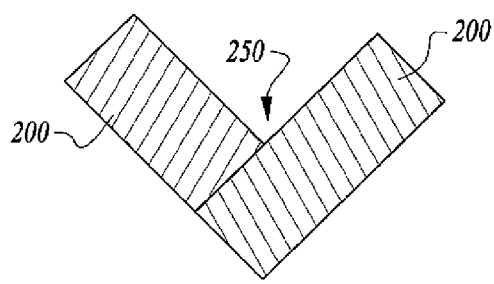
FIG. 3A is an end view of adjustable workpieces 200 and corresponding longitudinal weld cavity 250 of defined length positioned for a HD SubArc+MP™ metal powder fillet weld.
Figure 3B:
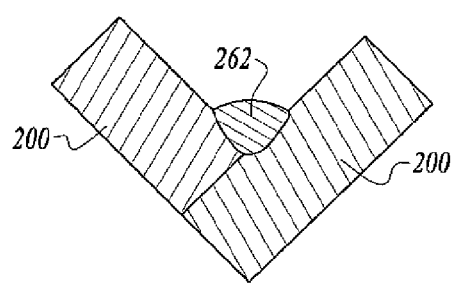
FIG. 3B is an end view of FIG. 3A after the HD SubArc+MP™ metal powder weld 262 has been made within the longitudinal fillet weld cavity 250.
Figure 4A:
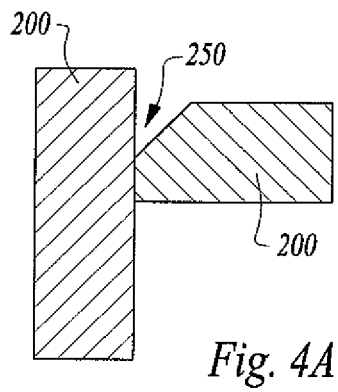
FIG. 4A is an end view of adjustable workpieces 200 and corresponding longitudinal weld cavity 250 of defined length positioned for a HD-SubArc+MP™ metal powder, partial penetration weld.
Figure 4B:
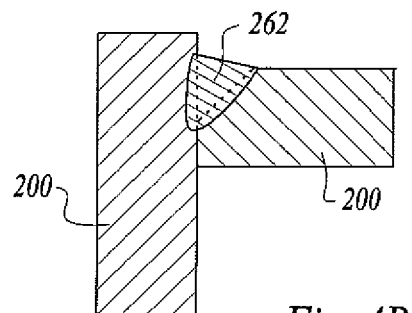
FIG. 4B is an end view of FIG. 4A after the HD-SubArc+MP™ metal powder weld 262 has been made within the longitudinal partial penetration weld cavity 250.
Figure 5A:
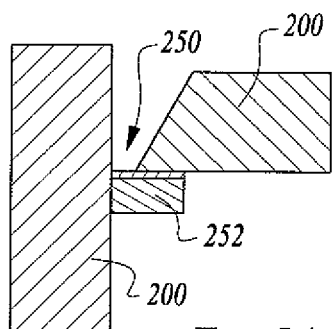
FIG. 5A is an end view of adjustable workpieces 200 and back-up bar 252 with corresponding longitudinal weld cavity 250 of finite length positioned for a multi-pass HD-SubArc+MP™ metal powder, full penetration weld.
Figure 5B:
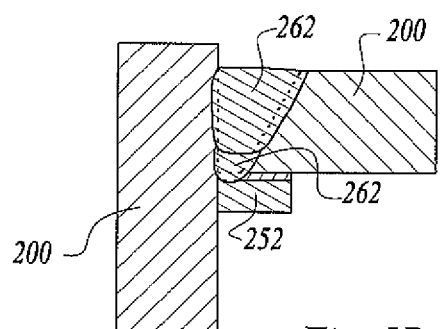
FIG. 5B is an end view of FIG. 5A after the HD-SubArc+MP™ metal powder welds 262 have been made within the longitudinal full penetration weld cavity 250, after two passes of the weld torches.
Figure 6A:
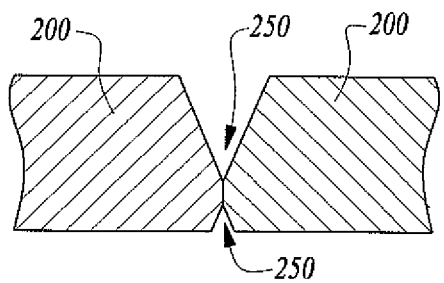
FIG. 6A is an end view of adjustable workpieces 200 and corresponding longitudinal weld cavities 250 of finite length positioned for a HD-SubArc+MP™ metal powder, double sided groove weld.
Figure 6B:
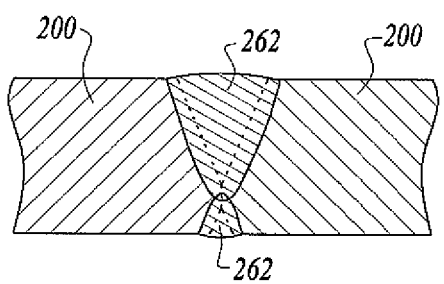
FIG. 6B is an end view of FIG. 6A after the HD-SubArc+MP™ metal powder weld 262 has been made within each longitudinal double sided groove weld cavity 250.
Figure 7A:
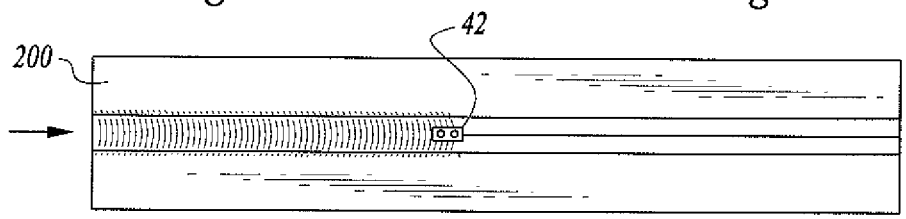
FIG. 7A is a representative top view of a single dual wire welding torch assembly 42 traveling within a longitudinal weld cavity of defined length within workpiece 200 according to an embodiment of the system and method for metal powder welding applications.
Figure 7B:
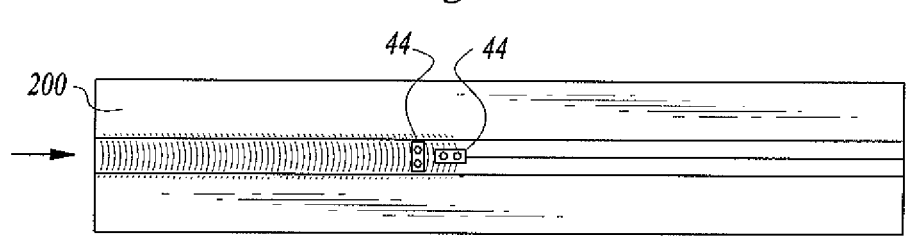
FIG. 7B is a representative top view of a tandem dual wire welding torch assembly 44 traveling within a longitudinal weld cavity of defined length within workpiece 200 according to an embodiment of the system and method for metal powder welding applications.
Figures 8, 9:
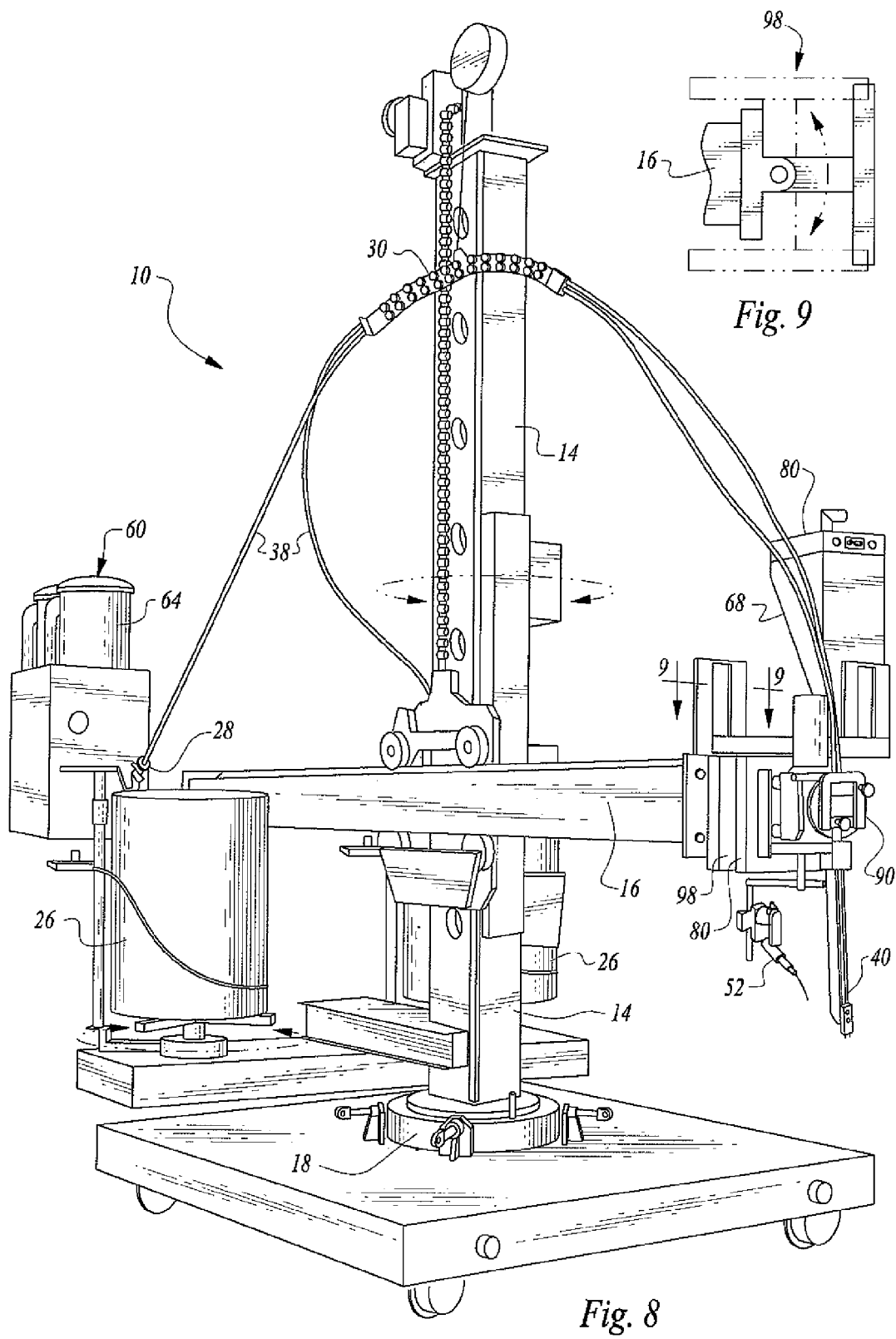
FIG. 8 is a perspective view of an embodiment of the system and method for metal powder welding applications including a column and boom assembly 10.
FIG. 9 is a top view detail of the boom swivel head assembly 98 of FIG. 8.
Figure 10:
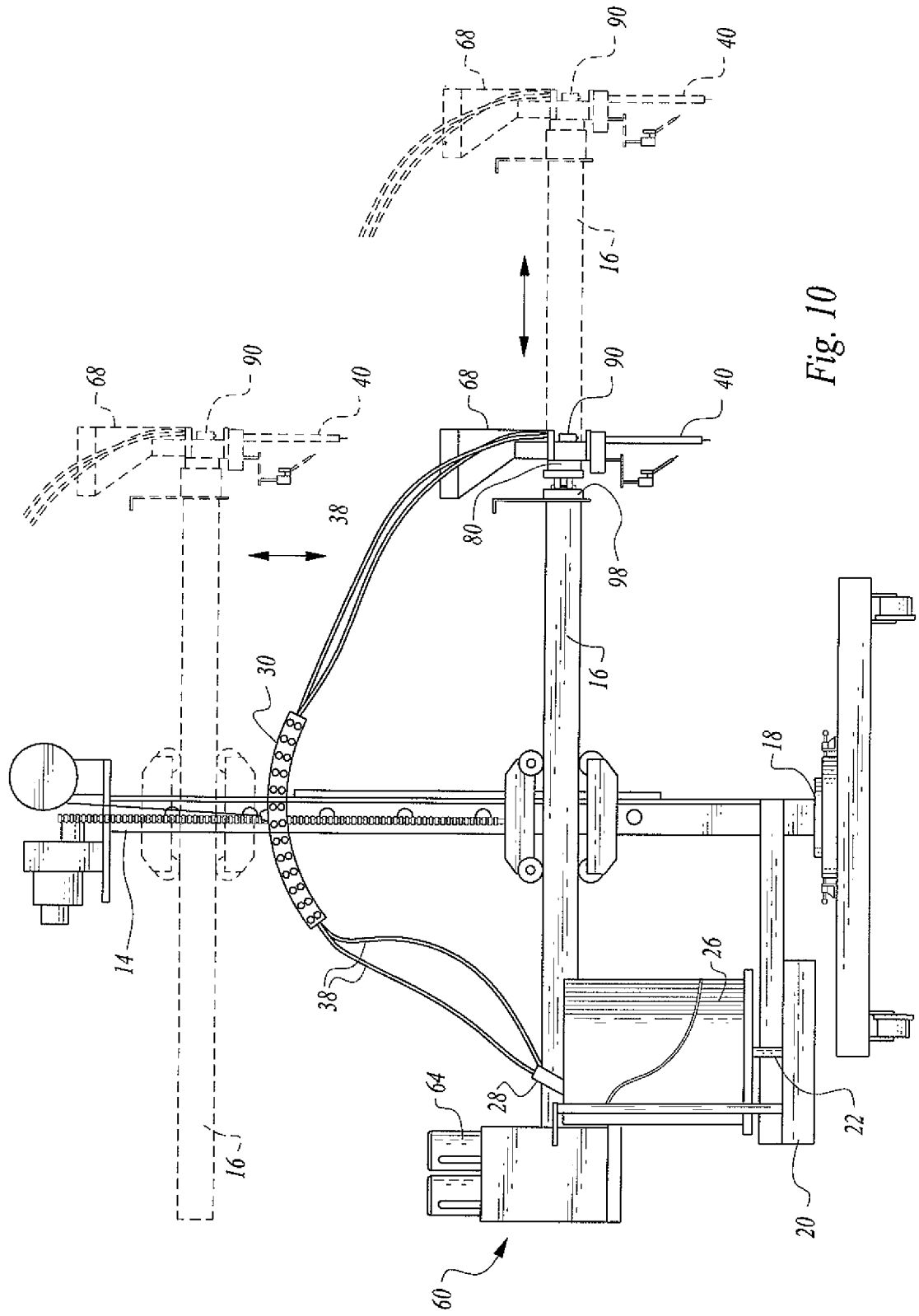
FIG. 10 is a side elevation view of an embodiment of the system and method for metal powder welding applications including a column and boom assembly 10.

The LDM-06X10 series of column and boom manipulator 10, FIGS. 8-10, of an embodiment of the system and method for metal powder welding is one example of a motion device to move the welding equipment down the weld seam of a metal powder weld. The column and boom manipulator 10 is designed with quality and durability in mind and is constructed to withstand the harsh and rugged environment of the welding industry.

An embodiment of the column and boom manipulator 10, FIGS. 8-10, has 6-ft of vertical column travel and 10-ft of horizontal boom travel. Other embodiments range from 12×12 ft to 20×20 ft. The length of the track and cable length are the limiting factor for the travel distance of the travel cars. The embodiment of the column and boom manipulator 10, FIGS. 8 and 10, includes: 1) a platform base; 2) a positioned vertical column element; 3) a positioned horizontal boom element having two ends, one end including a swivel boom with a 360 degree range of motion; 4) vertical and horizontal rails precisely machined in one single pass, resulting in unsurpassed smoothness in travel during the welding operation; 5) high tensile roller chain is used for vertical travel, with the addition of a counter balance system inside the column to provide smooth effortless vertical travel motion; 6) an anti-fall device; 7) travel limit switches for all motions; 8) a welding drum platform; 9) welding flux delivery/recirculation assembly; 10) at least one dual welding wire torch; 11) motorized welding wire feeder; 12) metal powder delivery system; 13) a push/pull welding wire feeding system component; 14) internally trucked cabling; and 15) variable speed DC gear motor for precision horizontal boom drive speed control.

A quadrature encoder attached to the back of the boom drive motor provides closed-loop feedback that allows the boom gear motor to maintain a precisely controlled weld travel speed within +/−1% of the preset, programmed travel speed.

A variable speed DC gear motor is also used for the vertical column drive. A quadrature encoder is also mounted to the back of the vertical column drive motor to provide closed-loop feedback for precision lifting of the boom without "jerking" on travel starts and stops. Mounting brackets are attached to the manipulator vertical column for mounting the electronic controls and cable tracks. Cable tracks are provided to carry the cables and hoses for both horizontal and vertical travel.

A boom extension is attached to the back of the horizontal boom to mount the welding flux recirculation and recovery system 60. Precision "V-Wheels" are mounted on the manipulator saddle to provide smooth travel for horizontal and vertical travel motion. The V-Wheels have heavy-duty roller bearings to support the boom load when the boom is fully extended. Provisions are provided at the base of the vertical column for an optional platform 20 to carry two 1000 pound drums 26 of welding wire.

The above described gear motors allow the Arcmatic™ Welding Control System to provide precise programmable computer control travel speed during the welding operation. All LMR-2, lockable manipulator vertical column rotator features of the LMR-2, lockable manipulator vertical column rotator include: 1) a slewing ring for mounting the manipulator column so that the column and horizontal boom can be rotated a smooth 360-degrees in any direction for the welding operation; and 2) positive locking on the sides of the slewing ring so pressure is applied to the side of the ring, without pressing vertically down on the precision rotation bearings.

The column and boom manipulator, mounted on top of the lockable manipulator vertical column rotation device, will allow the entire system to be: 1) bolted to the floor for fixed manipulator location, or 2) bolted on top of a travel car to provide forward and reverse travel motion of the entire manipulator assembly. Each manipulator travel car includes: 1) a variable speed DC gear motor with quadrature encoder feedback for accurate travel speed control from 5 inches-per-minute to 300 inches-per-minute; 2) articulated wire guides to reduce drag when pulling wire from wire drum 26 storage; 3) boom extension attached to the back of the horizontal boom to mount the welding flux recirculation and recovery system; and 4) drum covers for the 1000-lb wire drum 26 storage units. Either the manipulator boom or the travel car can be used for weld travel by merely selecting the weld travel direction on the operator's control panel prior to initiating the weld cycle start.

All of the equipment for an embodiment of the system and method of metal powder welding applications, including the 1) the boom swivel head assembly 98, FIG. 9, 2) seam tracking cross slides 80, 82, and 84, FIGS. 11-13, 3) seam tracking probe assembly 52, 4) wire feeder 90, 5) welding torch(es) 40, 6) secondary welding flux hopper 68, and 7) metal powder dispenser are mounted onto the front end of the manipulator boom, FIGS. 8-10. For an embodiment of the system and method of metal powder welding applications the boom swivel head assembly 98 is mounted to four threaded holes on the end of the boom. Assemblies for beam tracking cross slides 80, 82, and 84, FIGS. 11-13 respectively, are then added to the boom swivel head assembly 98 depending on the type of metal powder welding application being used. Assemblies and methods of support and operation of the equipment necessary for alternate embodiments of the system and method of metal powder welding applications include, but are not limited to, a boom manipulator 10, a single head gantry 12, a dual head gantry, a side-beam carriage, a portable tractor, and a moveable beam/stationary welding station.

The boom swivel is mounted on the end of the manipulator boom, FIGS. 8-10. For an embodiment of the system and method of metal powder welding, the seam tracking cross slides, the oscillator slide and the welding head assembly are mounted on the front face of the boom swivel head assembly 98, FIG. 9. The boom swivel head assembly 98 is an extremely heavy-duty mechanism for holding the entire welding head assembly firmly in position during the welding operation. The swivel can be rotated in the direction of weld travel and locked firmly in position to hold the weld head assembly steady for the welding operation.

To ensure smooth, continuous welding wire feeding to the weld puddle for the system and method of metal powder welding applications, a platform 20 to support two, 1000 pound welding wire drums 26 is provided on the base of the column manipulator to allow a pair of 1000 pound welding wire drums 26 to turn with the column and therefore maintain a constant relationship between the source of the welding wire and the welding torch. Each 1000 pound welding wire drum 26 is positioned on a rotational turning base assembly and a drag brake assembly, both assemblies having programmable computer control in conjunction with the weld torch function.

As the welding wire leaves the 1000 pound welding wire drum, the welding wire is received by a motorized rotating dual welding wire straightener 28, FIGS. 8 and 10. The motorized rotating dual welding wire straightener is capable of straightening two welding wires at the same time, even when the wire is pulled from separate 1000 pound welding wire drums. Straight wire provides the optimal operating results for the system and method of metal powder welding applications.

When welding wire manufacturers place welding wire into drum storage, the welding wire is pulled from a green rod reel and drawn down to size. The welding wire is then pulled through a molten bath to electro-coat the welding wire with copper to protect against oxidation. A set of roll assemblies puts cast and helix in the welding wire before it is in drums to allow the welding wire to lay flat in the drum. As welding wire is pulled from the welding wire drum 26 for welding operations, the cast and helix must be removed from the welding wire. If cast is not removed, the welding wire will be indiscriminately forced to one side of the weld cavity. The helix causes the welding wire to turn in the contact tip, changing cast direction during the weld. The variation in welding wire direction is a principal source of weld defects. The motorized rotating dual welding wire straightener 28 also removes both cast and helix from the welding wire.

The motorized rotating dual welding wire straightener 28 for an embodiment of the system and method of metal powder welding applications includes two rotating cylinders. Each cylinder has a three-roll straightener that can be adjusted to counter-bend the welding wire cast. Since the cylinder is rotating at all times, as the helix changes the cast direction, the rotating three-roll counter-bending mechanism continually finds the cast direction and straightens the wire irrespective of how the helix changes cast direction. The rotation speed of the straightener assembly is controlled by the computer that sets the speed of rotation proportional to the wire feed speed.

The motorized rotating dual welding wire straightener 28 for an embodiment of the system and method of metal powder welding applications includes a push/pull welding wire feeding system component. This push/pull wire feeding system is designed to pull wire from a 1000-lab drum 26 of welding wire and push it to the welding wire guide 30 and welding torch assembly 40. This system is composed of a two wire feeder—a push feeder and a pull feeder. This push/pull arrangement provides the following advantages: 1) the push-feeder helps overcomes the high rotating inertia of a 1000-lb drum 26 of welding wire, eliminating jerky starts and stops of the welding wire; 2) the push-feeder pulls the welding wire from the drum 26, through a 3-roll wire counter-bending unit to straighten the welding wire; 3) after straightening the wire the push-feeder pushes the welding wire through a conduit assembly to the main pull-feeder and welding torch assembly; 4) the push-feeder is controlled by a torque motor (stall motor) controller that allows the pushing force to be adjusted to eliminate wire buckling; 5) the pull-feeder is controlled by a closed loop constant speed motor control to provide constant wire speed to the welding torch; 6) the pushing and pulling action substantially reduces the drag on the welding wire as it is pulled from the drum, and pushed to the welding torch, allowing constant and smooth wire feeding for the welding operation.

The result provided by the push/pull wire feeding system is a smooth, trouble-free, wire feeding system that allows the wire to feed smoothly through long conduits and around radiuses and loops.

The push/pull wire feeding system consists of Arcmatic's basic wire feeders, using DC motors with planetary gear boxes. The main difference between the push motor and the pull motor is that the push motor is controlled by a torque motor controller and the pull motor is controlled by a closed-loop constant speed DC motor controller. The two motors, working in unison, completely relieve the main wire feeder (pull motor) from the strain of pulling wire against ever increasing wire conduit friction.

Another feature of the push/pull wire feed system is a breaking system that further helps smooth out drum rotation. The starting and stopping of the 1000-lb drum 26 of welding wire is controlled by an electric breaking system that prevents the drum from over spinning when there is slack in the welding wire. This slack can cause the wire to over-spin because of the inertia created by the heavy rotating drum 26. If the wire were allowed to over-spin, this could cause wire tangling that would stop the welding operation. When the wire starts to over-spin, a three-way solenoid valve allows air to escape, releasing the brake, resulting in zero drag on the welding wire. If necessary, a small spring can be added to provide a small amount of drag on the rotator to allow for smooth drum rotation.

At least one articulated U-groove welding wire guide 30 is positioned between the motorized rotating dual welding wire straightener 28 and the welding torches 40 on the support assembly for an embodiment of the system and method of metal powder welding applications, FIGS. 8-9. Each articulated wire guide 30 includes multiple sections of machined aluminum blocks that, when fitted together, allow each section to swivel independently relative to adjoining sections. Two U-groove bearings are mounted on each block, forming a channel through which the welding wire travels between the welding wire drums and the welding torches on the support assembly.

The power module for an embodiment of the system and method of metal powder welding applications provides 12-VDC for the computerized welding controls. It also provides 24-VDC and 80 VDC for all motors in the system.

The (3-MC) manipulator motor control module for an embodiment of the system and method of metal powder welding applications controls all three motors on the manipulator. The vertical lift gear motor is located on top of the manipulator column. The horizontal boom gear motor is located on the saddle. The travel car gear motor is located under the travel car and turns the travel car axle to move the travel car in a forward and reverse direction down the travel car track assembly. Quadrature encoders are attached to each of the motors for precision close-loop feedback computer control.

The six-axis control module for an embodiment of the system and method of metal powder welding applications is computer driven, and is capable of programmable control of up to six axis of motion—depending on selected options that are included in the control system of the manipulator.

The motor control modules that can be added to the six-axis control module controller for an embodiment of the system and method of metal powder welding applications include: 1) wire feed motor controller; 2) motorized wire straightener motor controller; 3) horizontal seam tracking motor controller; 4) vertical seam tracking motor controller; 5) oscillator motor controller; 6) metal powder dispenser motor controller. For heavy plate welding applications with metal powder, a metal powder motor controller is added to increase deposition rate. All motors have quadrature encoders attached to the back of the motor shaft to send signals back to each motor controller to insure constant speed and position control. Each motion controller receives commands for speed and position of each motor. The motor controller is able to hold the motor speed and position constant by using the signals from the motor encoder and using that information to and using that information to automatically insure that the speed and position are held constant until a new command is received.

Figure 19:
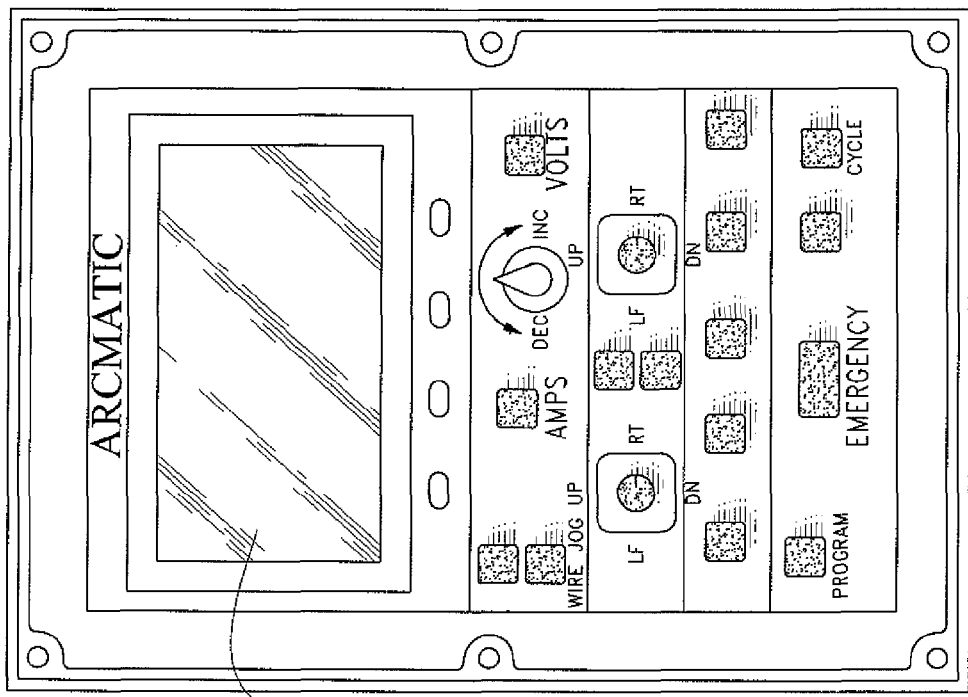
FIG. 19 is a front view of a representative operator's control panel 138 and LCD graphics panel 166 of FIG. 17.
Figure 18:
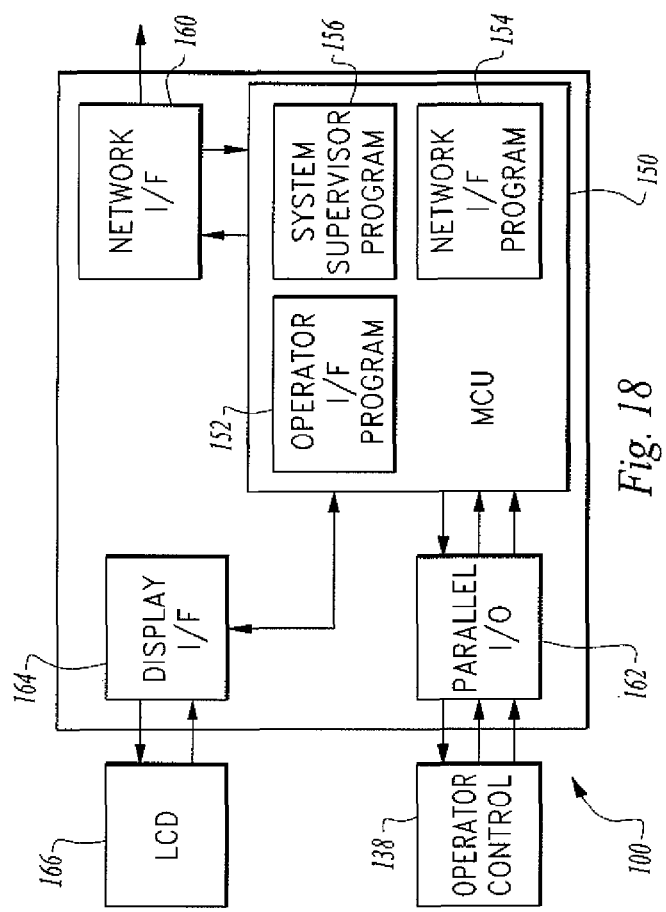
FIG. 18 is representative system schematic of operator's control interface 100 including the operator's control panel 138 and liquid crystal display (LCD) graphics panel 166, parallel input and output unit 162, display interface 164, microprocessor control unit 150, operator interface program 152, network interface program 154, system supervisor program 156, and network interface 160.
Figure 20:
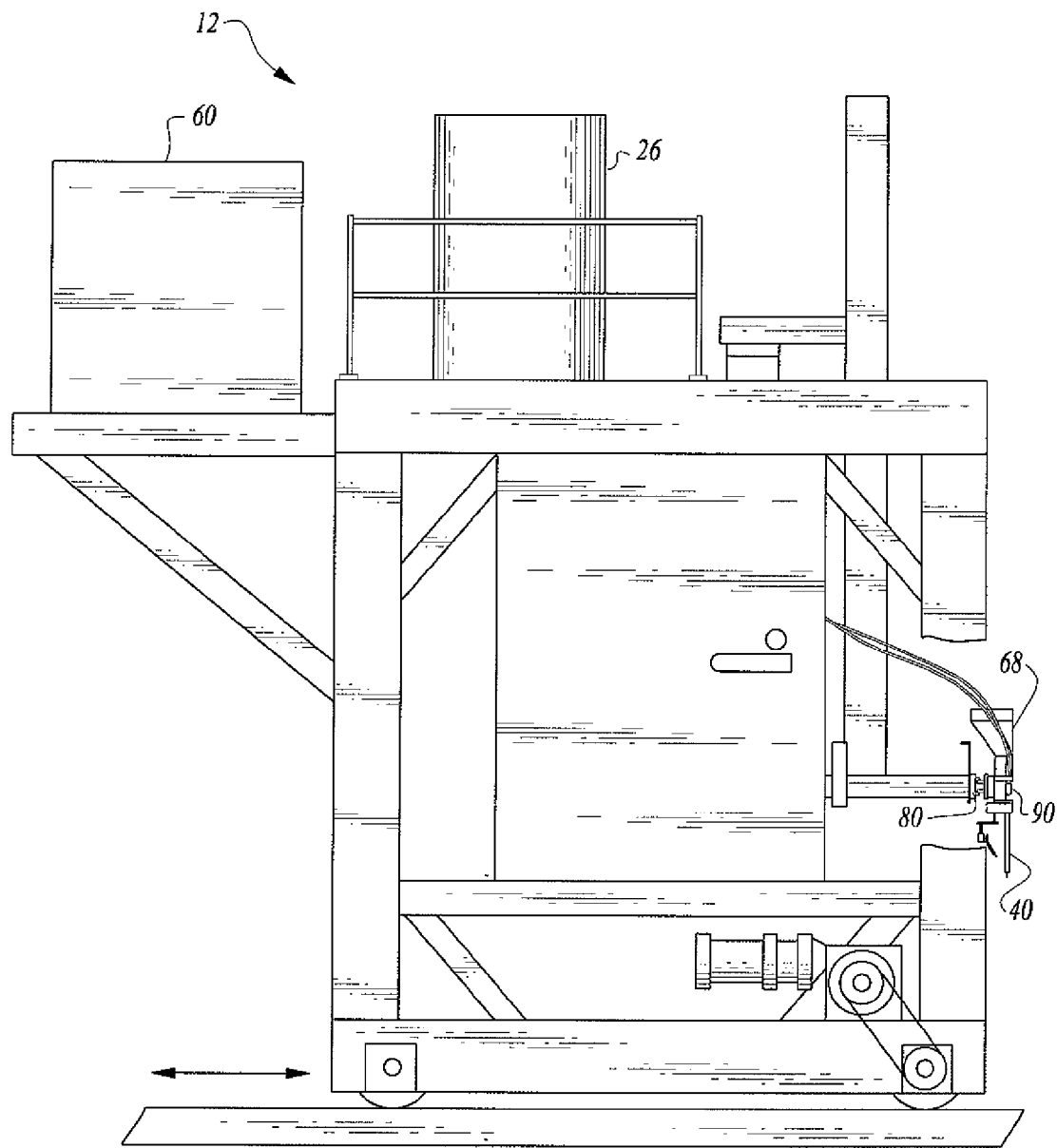
FIG. 20 is a side elevation view of an embodiment of the system and method for metal powder welding applications including a gantry assembly 12.

The operator's control panel module ("OCP"), FIGS. 18-19, for an embodiment of the system and method of metal powder welding applications allows an operator to use a simple "fill-in-the-blanks" programmable control for entry of all of the welding and motion control functions. In less than 30-minutes, the average operator can learn how to enter or recall a welding program. Once the perfect welding program has been created, it can be repeated thousands of times—the same exact program, over-and-over, exactly the same every time. The function of the operator's control module is to receive and store all of the various welding programs, and to communicate between the modular control central computer processing unit ("MCU") 150 and (WPS) welding power supply control unit 148. The operator's control panel module 138 provides display and monitor functions to the operator for all real time welding operation data and information, any possible errors, all operator commands, all emergency stop safety features, and all audible warning signals.

The Welding Power Supply (WPS) control module 148 for an embodiment of the system and method of metal powder welding applications controls the welding power supplies. The working functions of WPS control module include: 1) controlling the welding power supply voltage; 2) compensating for voltage drop from the power supply to the welding torch; 3) reporting all the welding data (through a standard RS-232 communication buss); and 4) controlling the preprogrammed power supply portion of the weld program. Real time welding data can be displayed on a PC computer during the welding operation and stored on a CD Rom for future reference or remote troubleshooting electrical problems.

The Arcmatic™ dual-wire feeder and welding torch assembly for an embodiment of the system and method of metal powder welding applications includes the welding head mounted inside the lead/lag torch adjustment mechanism. Each wire has two idler rolls—one on the top and one on the bottom of the drive roll. As the operator turns the hand wheel to force the welding wire into the V-groove of the drive roll, the top idler pulls against the bottom idler to equalize the pressure against the drive roll. This equalized pressure eliminates any deflection of the drive roll shaft that causes wire slippage and overloads the wire feed motor and gearbox. Eliminating slippage allows all welding wires to feed at exactly the same speed at all times. The mounting plate of the torch swivels protects the front two slots of the oscillator slide from excessive contamination for dust, dirt, and welding flux. These two mechanisms allow the wire feeder and welding torch to be swiveled either right-or-left 45-degrees (for fillet welding), and forward-or-reverse for adjusting the lead or lag angle of the welding torch by loosening the two knobs on the front face of the wire feeder and swiveling the welding torch either right or left (whichever is required to make the desired weld). When the angle has been set, the two screws are then tightened to hold the torch in position during the welding operation.

The pressurized air vacuum mounted on top of a secondary welding flux hopper for an embodiment of the system and method of metal powder welding applications allows the secondary welding flux hopper to be refilled by the operator as the welding flux empties during the welding operation. The Arcmatic™ secondary welding flux hopper can be sealed at the top by a metal cover if the hopper is used in conjunction with the welding flux recirculation system. If used with the AirVac™ welding flux vacuum, the AirVac™ welding flux vacuum unit is mounted on top of the secondary hopper and the unit drops vacuumed welding flux directly into the hopper with a release handle mounted on the side of the AirVac™ unit.

Programmable, computer control of the embodiments of the system and method of metal powder welding applications includes modular control and corresponding modular control interfaces to facilitate the hardware characteristics of system components, to isolate hardware from the software by using separate motion controllers for every motor. Thus, central point software is principally responsible for time sequences and all welding parameters. The programmable, computer control of the embodiments of the system and method of metal powder welding applications provides unlimited reconfiguration potential with different system modules for automated metal powder welding operations. Supervision and omnibus control of every component or subsystem is placed in the central processing unit; however, every basic component or subsystem of embodiments of the system and method of metal powder welding applications has its own internal control. All welding data is collected in the central processor, and all decisions are made from the central processor. This system supervisory hierarchy creates perfect conditions for every weld, and assures repeatable and identical welds every time.

For example and without limitation, an embodiment of the system and method of metal powder welding applications includes the following components or subsystems: 1) system power supply module 102; 2) at least one controllable travel module 110/112; 3) controllable vertical positioning module 106; 4) controllable horizontal positioning module 108; 5) controllable wire straightening module 124; 6) controllable wire feeder module 122; 7) controllable horizontal slide module 118; 8) controllable vertical slide module 116; 9) controllable welding flux dispenser module 134; 10) controllable metal powder dispenser module 132; 11) controllable shield gas control module; 12) controllable oscillator module 120; 13) operator interface module 138; 14) welding power supply (ies) control module 148; 15) contact probe module 126; 16) non-contact (laser) probe module 126; 17) central computer module 150; and 18) external welding data storage module 144.

Within each component or system, subsystem internal control hierarchies at the component source are provided for an embodiment of the system and method of metal powder welding applications, FIGS. 14-19. The travel motion subsystem 104 of the travel module for an embodiment of the system and method of metal powder welding applications controls motion of the vertical (beam), horizontal (boom), and other stored travel histories, FIG. 15. The horizontal and vertical axes can be carriages, if used on a gantry system. A boom manipulator embodiment of the system and method of metal powder welding applications includes only one travel module. For a gantry embodiment of the system and method of metal powder welding applications, at least two travel modules are necessary.

Figure 17:
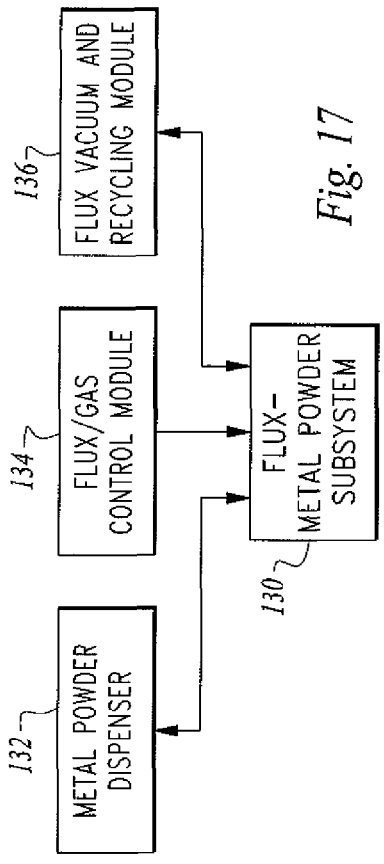
FIG. 17 is a representative control schematic for the welding flux-metal powder subsystem 130 of the modular welding control system 100 of FIG. 13 for an embodiment of the system and method for metal powder welding applications.

The welding flux-metal powder subsystem 130 of the welding flux dispenser module and the metal powder dispenser module for an embodiment of the system and method of metal powder welding applications controls the metal powder dispenser 132, the welding flux/gas control module 134, and the welding flux vacuum and recycling module 136, FIG. 17.

Figure 16:
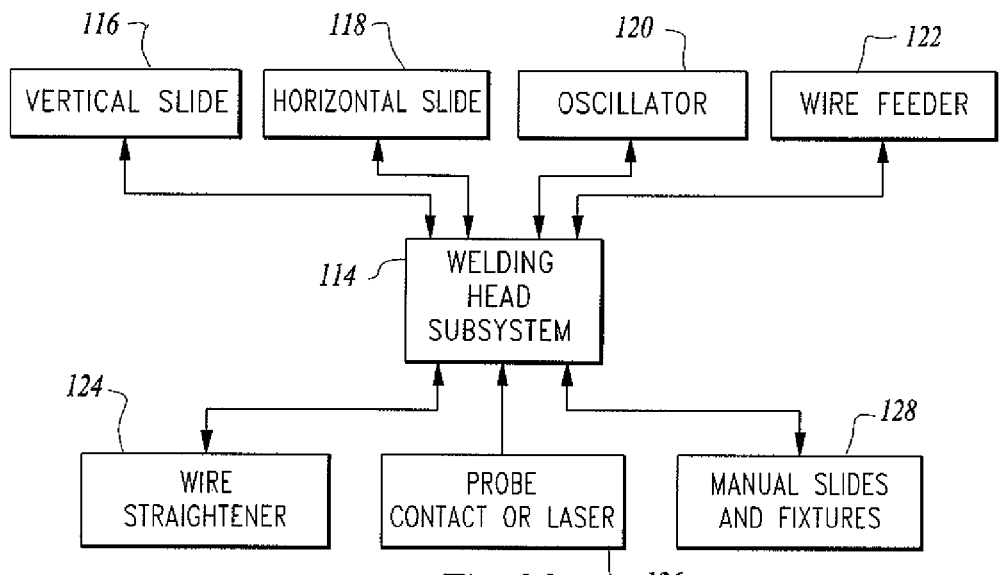
FIG. 16 is a representative control schematic for the welding head subsystem 114 of the modular welding control system 100 of FIG. 13 for an embodiment of the system and method for metal powder welding applications.

The welding head subsystem 114 for an embodiment of the system and method of metal powder welding applications controls the vertical slide 116, horizontal slide 118, oscillator 120, controllable wire feeder 122, controllable motorized welding wire straightener 124, probe or contact or laser 126, and manual slides and fixtures 128, FIG. 16. Welding head subsystems have a wide range of variation, depending on the welding process used. The preferred embodiment of welding head subsystem of the system and method of metal powder welding applications includes at least one head rotator module, at least one dual axis motorized slide module 116 and 118, at least one oscillator module 120, at least one wire feeder module 122, and at least one wire straightener module 124. This assembly allows the welding torch and accompanying welding wire positions within the welding cavity to be controllably varied to meet the requirements of the welding process.

Figure 21:
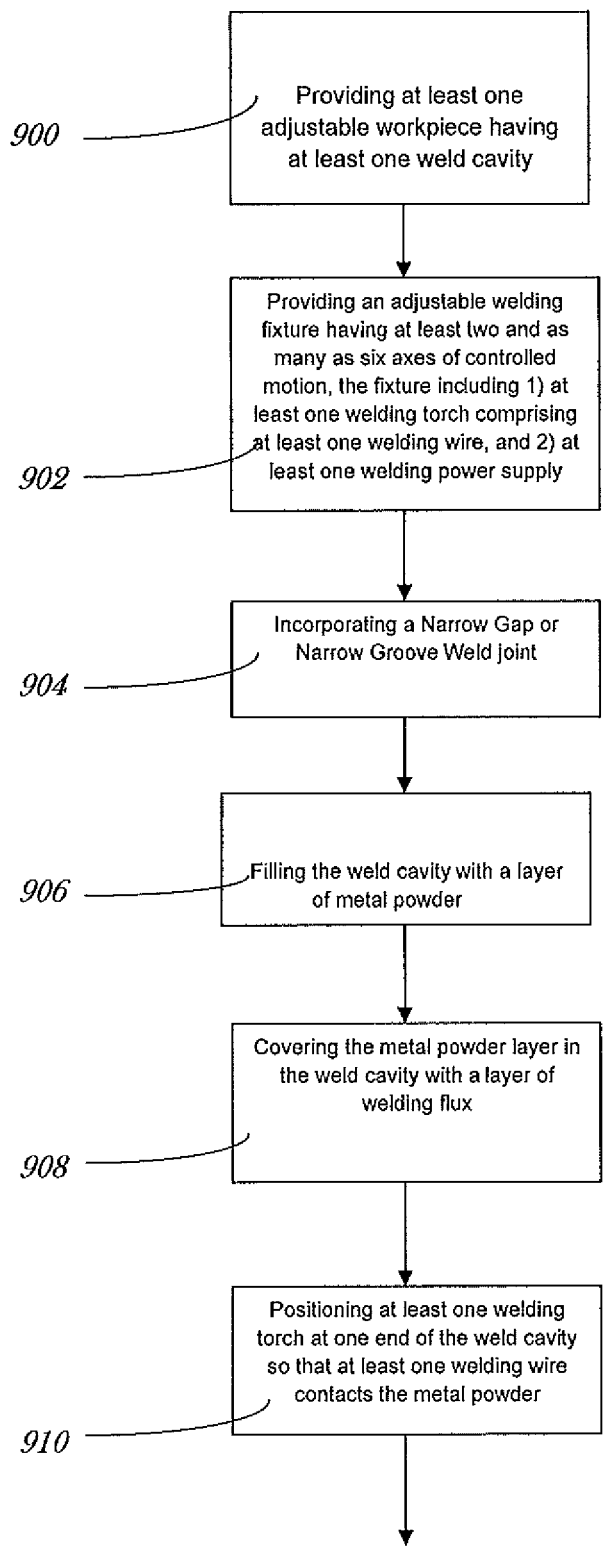
FIG. 21 is a partial flow diagram of the steps of a method for an embodiment of the system and method for metal powder welding applications.
Figure 22:
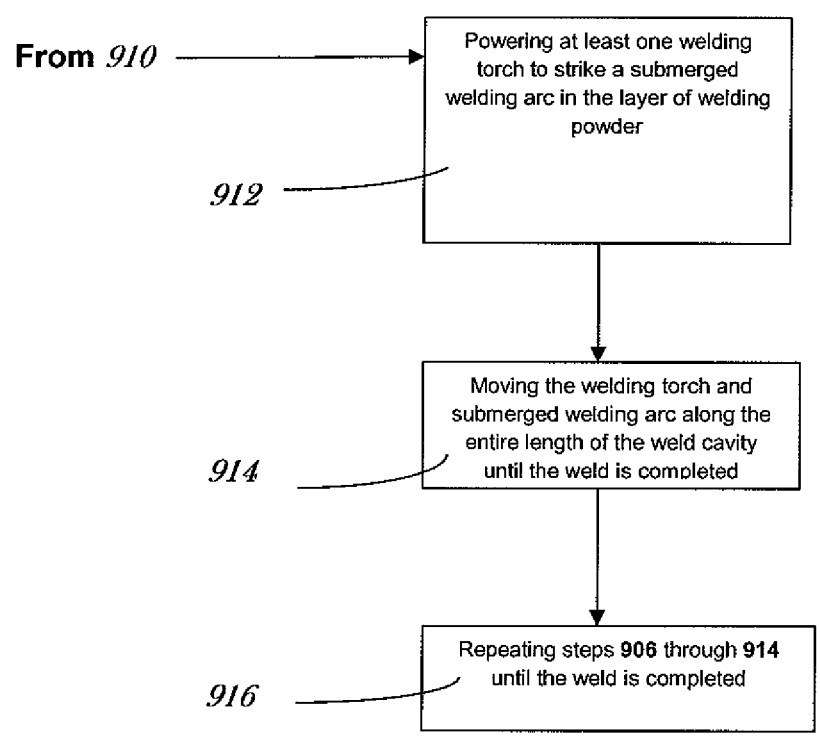
FIG. 22 is the balance of the flow diagram of FIG. 21 of the steps of a method for an embodiment of the system and method for metal powder welding applications.

An embodiment according to the system and method for metal powder welding applications for longitudinal welds on beams and columns or longitudinal or circumferential welds on heavy walled vessels includes the following steps, FIGS. 21-22:

a) Providing at least one adjustable work piece having at least one weld cavity 900;

b) Providing an adjustable welding fixture having at least two axes and as many as six axes of controlled motion, the fixture including 1) at least one welding torch comprising at least one welding wire, and 2) at least one welding power supply 902;

c) Incorporating a Narrow Gap or Narrow Groove Weld joint 904 d) Filling the weld cavity with a layer of metal powder 906;

e) Covering the metal powder layer in the weld cavity with a layer of welding welding flux 908;

f) Positioning at least one welding torch at one end of the weld cavity so that at least one welding wire contacts the metal powder 910;

g) Powering at least one welding torch to strike a submerged welding arc in the layer of welding powder 912;

h) Moving the welding torch and submerged welding arc along the entire length of the weld cavity 914; and i) Repeating steps d) through h) until the weld is completed 916.

Embodiments to the system and method for metal powder welding depicted in FIGS. 21-22 comprise one or more of the following steps: 1) feeding metal powder into the weld cavity ahead of the moving welding torch; 2) feeding welding flux into the weld cavity and onto the metal powder layer ahead of the moving welding torch; 3) providing at least one square wave AC power supply; 4) providing a weld cavity seam tracker to align the submerged welding arc in the metal powder layer and welding flux layer within the weld cavity; and 5) providing a matching ratio between the metal powder and welding wire within the weld cavity.

Therefore, the foregoing is considered as illustrative only of the principles of the invention. Additionally, since numerous modifications and changes will readily occur to those skilled in the art, it is not desired to limit the invention to the exact construction and operation shown and described, and further, all suitable modifications and equivalents may be resorted to, falling within the scope of the invention.

I claim:

1. A method for high deposition, submerged arc welds with metal powder, the method comprising the steps:
   a) providing at least one adjustable workpiece having at least one horizontally disposed weld cavity, each horizontally disposed weld cavity comprising a finite length;
   b) providing an adjustable welding fixture having at least two axes and as many as six axes of controlled motion, the fixture comprising 1) at least one welding torch comprising at least one welding wire, and 2) at least one square wave AC welding power supply;
   c) filling a single, horizontally disposed weld cavity with a layer of metal powder;
   d) covering the metal powder layer in the single, horizontally disposed weld cavity with a layer of welding flux;
   e) positioning at least one welding torch at one end of the single, horizontally disposed weld cavity so that at least one welding wire contacts the metal powder;
   f) powering at least one welding torch to strike a submerged welding arc in the layer of metal powder;
   g) moving the welding torch and submerged welding arc along the entire length of the single, horizontally disposed weld cavity;
   h) repeating steps c) through g) until the weld is completed for the single, horizontally disposed weld cavity; and
   i) repeating steps c) through h) until all horizontally disposed weld cavities in the workpiece have been welded.

2. A method for high deposition, submerged arc welds with metal powder as recited in claim 1, where step g) further comprises feeding metal powder into the single, horizontally disposed weld cavity ahead of the moving welding torch.

3. A method for high deposition, submerged arc welds with metal powder as recited in claim 1, where step g) further comprises feeding welding flux into the single, horizontally disposed weld cavity and onto the metal powder layer ahead of the moving welding torch.

4. A method for high deposition, submerged arc welds with metal powder as recited in claim 1, the method further comprising the step of providing a weld cavity seam tracker to align the submerged welding arc in the metal powder layer and welding flux layer within the single, horizontally disposed weld cavity.

5. A method for high deposition, submerged arc welds with metal powder as recited in claim 1, where step d) further comprises providing welding flux consisting of less than 20% by weight of $Al_2O_3$.

6. A method for high deposition, submerged arc welds with metal powder as recited in claim 1, where step c) further comprises providing a matching ratio between the metal powder and welding wire within the single, horizontally disposed weld cavity.

7. A method for high deposition, submerged arc welds with metal powder as recited in claim 1, wherein steps c) through i) are controlled by providing at least one electrical control module for at least one provided controllable motorized slide box assembly, at least one provided mechanical, air-cooled contact seam tracking probe, at least one provided controllable wire feeder assembly, at least one provided controllable metal powder dispenser, at least one provided controllable welding flux dispenser and recirculation assembly, at least one provided controllable motorized welding wire straightener, at least one provided welding power supply, at least one provided welding torch position within the single, horizontally disposed weld cavity, and at least one provided modular control interface.

8. A method for high deposition, submerged arc welds with metal powder as recited in claim 7, wherein each at least one provided modular control interface comprises:
   a) at least one provided operator's control panel and display;
   b) at least one provided parallel input and output unit;
   c) at least one provided display interface;
   d) at least one provided programmable microprocessor control unit;
   e) at least one provided operator interface program resident in and controlled by the at least one provided programmable microprocessor control unit;
   f) at least one provided network interface program resident in and controlled by the at least one provided programmable microprocessor control unit;
   g) at least one provided system supervisor program resident in and controlled by the at least one provided programmable microprocessor control unit; and
   h) at least one provided network interface.

9. A method for high deposition, submerged arc welds with metal powder as recited in claim 1, further comprising providing at least one at least one motion device superstructure selected from the group consisting of 1) a vertical column and boom manipulator, 2) single head gantry, 3) dual head gantry, 4) side beam carriage, 5) portable tractor, and 6) movable beam/stationary welding station.

* * * * *